United States Patent
Yurushi

(10) Patent No.: US 6,854,552 B2
(45) Date of Patent: Feb. 15, 2005

(54) FORK LIFT WITH TRAVERSE MOTION SYSTEM

(75) Inventor: Toshiyuki Yurushi, Osaka (JP)

(73) Assignee: TCM Corporation, Osaka (JP)

(*) Notice: Subject to any disclaimer, the term of this patent is extended or adjusted under 35 U.S.C. 154(b) by 178 days.

(21) Appl. No.: 10/343,659

(22) PCT Filed: Jun. 28, 2001

(86) PCT No.: PCT/JP01/05602

§ 371 (c)(1),
(2), (4) Date: Feb. 3, 2003

(87) PCT Pub. No.: WO02/12111

PCT Pub. Date: Feb. 4, 2002

(65) Prior Publication Data

US 2004/0020724 A1 Feb. 5, 2004

(30) Foreign Application Priority Data

Aug. 4, 2000 (JP) .................................... 2000-236329

(51) Int. Cl.[7] .............................................. B60K 17/30
(52) U.S. Cl. ...................................... 180/253; 180/234
(58) Field of Search ................................ 180/411, 253, 180/233, 234, 236; 187/222; 414/662, 664, 668; D34/34

(56) References Cited

U.S. PATENT DOCUMENTS

| | | | | |
|---|---|---|---|---|
| 2,986,295 A | * | 5/1961 | Shaffer | 414/633 |
| 3,998,288 A | * | 12/1976 | Aoki | 180/211 |
| 4,024,968 A | * | 5/1977 | Shaffer et al. | 414/542 |
| 4,279,604 A | * | 7/1981 | Kooi et al. | 414/667 |
| 4,498,554 A | * | 2/1985 | Young et al. | 180/236 |
| 4,599,030 A | * | 7/1986 | Skaalen et al. | 414/460 |
| 4,823,899 A | | 4/1989 | Ron | |
| 4,893,689 A | * | 1/1990 | Laurich-Trost | 180/414 |
| 5,409,346 A | * | 4/1995 | Grether | 414/631 |
| D448,136 S | * | 9/2001 | Yurushi et al. | D34/34 |
| 6,398,480 B1 | * | 6/2002 | Baginski et al. | 414/631 |
| 6,557,658 B1 | * | 5/2003 | Enmeiji et al. | 180/236 |
| 6,675,927 B1 | * | 1/2004 | Enmeiji et al. | 180/411 |

FOREIGN PATENT DOCUMENTS

| | | | |
|---|---|---|---|
| JP | 02-306879 A | 12/1990 | |
| JP | 02306879 A | * 12/1990 | ............ B62D/7/08 |
| JP | 05-246346 A | 9/1993 | |
| JP | 10-244951 A | 9/1998 | |

* cited by examiner

Primary Examiner—Lesley D. Morris
Assistant Examiner—Daniel Yeagley
(74) Attorney, Agent, or Firm—D. Peter Hôchberg; Sean Mellino; Katherine R. Vieyra

(57) ABSTRACT

A fork lift with a traverse travel system, wherein a pair of right and left front wheels (3) and a pair of rear wheels (4) can be steered to face sideways at a right angle relative to a body (2), the front wheel (3) is mounted to a turning member (27) installed on a mast (6) to be turnable around a vertical axis (26) and a rotating apparatus (40) is provided for the turning member (27), the front wheel (3) is operatively connected to a travel drive device (30) installed on the turning member (27), and the travel drive device (30) can also be rotated together with the turning member (27) when the front wheels (3) are steered sideways at a right angle and positioned outside of the outer surface of the mast. Thus, the mast (6) needs not be disposed unnecessarily forward of the front wheels (3) for the sake of the travel drive device (30), and the balance of the body in the longitudinal direction can be preferably kept without increasing its self weight.

1 Claim, 6 Drawing Sheets

FORK LIFT WITH TRAVERSE MOTION SYSTEM

TECHNICAL FIELD

This invention relates to a forklift having a traverse travel system, which can be switched to a lateral travel mode.

BACKGROUND ART

Conventionally, vehicles having a traverse travel system have been found among large size conveyance vehicles and some loaders, and reach style electric vehicles as forklifts. In addition, there exists a side forklift with a mast and forks installed sideways in relation to the movement direction of the vehicle to allow the vehicle to handle elongated objects. However, there are no counter balance type forklifts that can move sideways and function like a side forklift in addition to such tasks as generally required. To realize this type of forklift, the front wheels or driving wheels are required to be steerable sideways.

Therefore, a conventional forklift 1, shown in FIG. 8, has a pair of right and left front wheels 3 (driving wheels) in a front part of a vehicle body 2, a pair of right and left rear wheels 4 (steerable wheels) in a rear part, and a driver's seat 5 on an upper front part of the vehicle body 2. A mast 6 capable of vertically extending and retracting is located at a front end of the vehicle body 2 to be able to tilt in a front-and-rear direction through a front wheel axle 7 extending in a vehicle width direction. Additionally, tilt cylinders 8 enabling the mast 6 to tilt forward and backward are placed between the vehicle body 2 and the mast 6.

Above mentioned mast 6 comprises a pair of right and left outer frames 9 on the side of forklift 1 and a pair of right and left inner frames 10 capable of vertical movement by being guided by the outer frames 9. Disposed between the outer frames 9 and inner frames 10 is a lift cylinder 11. Additionally, lift brackets 12 capable of vertical movement by being guided on inner rails 10 are provided, and a pair of right and left forks 13 are secured to the lift brackets 12 through a pair of upper and lower finger bars.

The above mentioned driver's seat 5 includes a seat 15, a steering wheel 16 located in front of the seat 15, and a headguard 19 disposed thereabove through front pipes 17 and rear pipes 18 which are erected on the vehicle body 2. Additionally, a counterweight 20 is located in the rear of the seat 15 on the vehicle body 2.

However, since the right and left front wheels 3 are driven by a same travel drive system which is common to both wheels, the above mentioned conventional forklift 1 cannot effect straight-sideways steering of the front wheels, thus being unable to move laterally.

DISCLOSURE OF INVENTION

The present invention has an object to provide a forklift with a traverse travel system, in which front wheels and rear wheels can be steered straight sideways and the balance in front and rear can be maintained properly.

To achieve this objective, the forklift with a traverse travel system in this invention comprises a pair of right and left front wheels, a pair of right and left rear wheels, both of the front and rear wheels being mounted to a vehicle body to be steerable by 90 degrees, a mast located in the front end of the vehicle body, forks and linking members each installed on the mast, holding members fixed on the linking members, and turning members mounted to the holding members to be rotatable around vertical axes, the turning members being mounted with the front wheels and provided with turning means for turning the turning members, whereby the pair of right and left front wheels are operatively connected to travel drive means respectively installed onto the turning members.

According to the configuration of the above mentioned invention, during normal travel, both the right and left front wheels and the right and left rear wheels are steered either forward or backward. In this condition, a lift lever is then used to raise or lower the forks along the mast to accomplish expected fork operations. When changing from a normal travel operation to a traverse travel operation, for example, a lever-style traverse travel mode switch is operated to activate a rotating means. Therefore, operating the rotating means allows the front wheels to turn around the vertical axes, enabling steering of the front wheels by 90 degrees (straight sideways) in relation to the vehicle, thus the forklift can travel laterally either right or left after the front wheels are steered straight sideways.

Additionally, when the front wheels are steered straight sideways, a travel drive means also turns integrally with the turning members and allows the front wheels to be positioned on the outside of the outer surface of the mast. In this style where the front wheels can be operated to be able to steer straight sideways, it will eliminate the requirement for the mast to be positioned more forwardly than necessary in relation to the front wheels due to the travel drive means. Therefore, this method allows the mast to be installed in the same way as in a conventional non-traverse traveling forklift, that is, the balance of the front and rear can be maintained satisfactorily without increasing its self weight.

BRIEF DESCRIPTION OF THE DRAWINGS

FIG. 2 is a side view of the forklift with a traverse travel system during normal travel time;

BEST MODE FOR CARRYING OUT THE INVENTION

Figure 1:
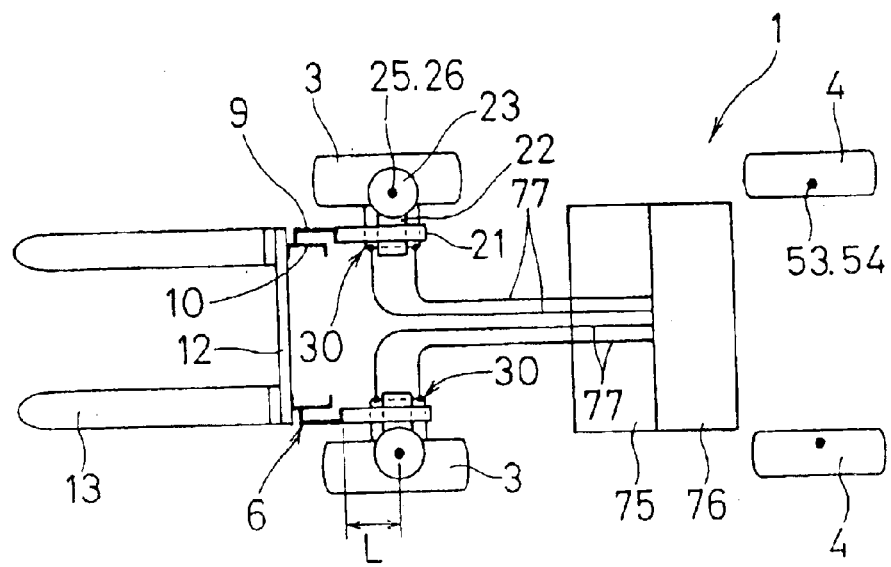
FIG. 1 is a schematic top view of a forklift with a travel drive system according to an embodiment of the invention, emphasizing travel drive means, wherein (a) shows normal travel time and (b) shows traverse travel time.
Figure 1:
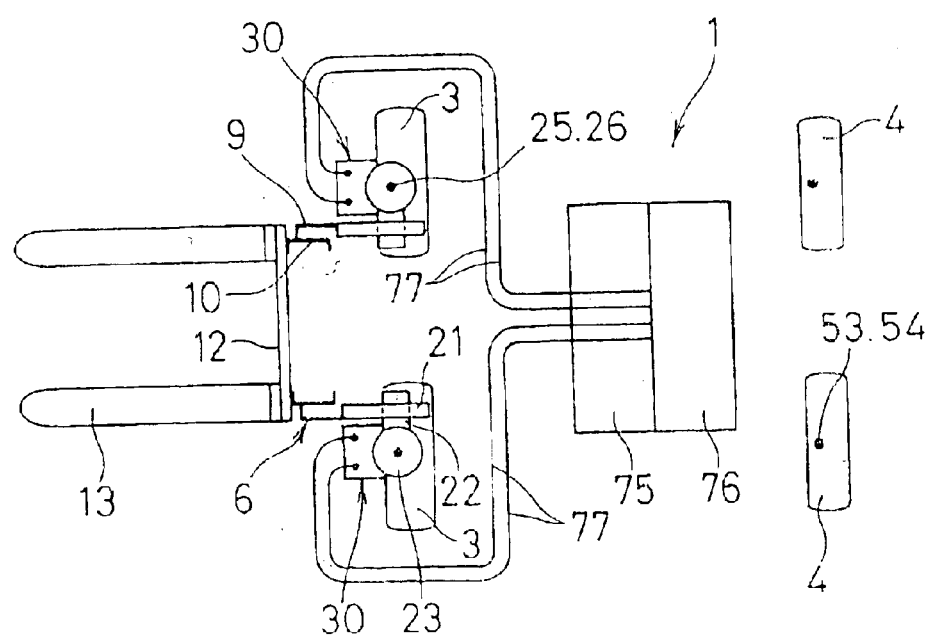
Figure 2:
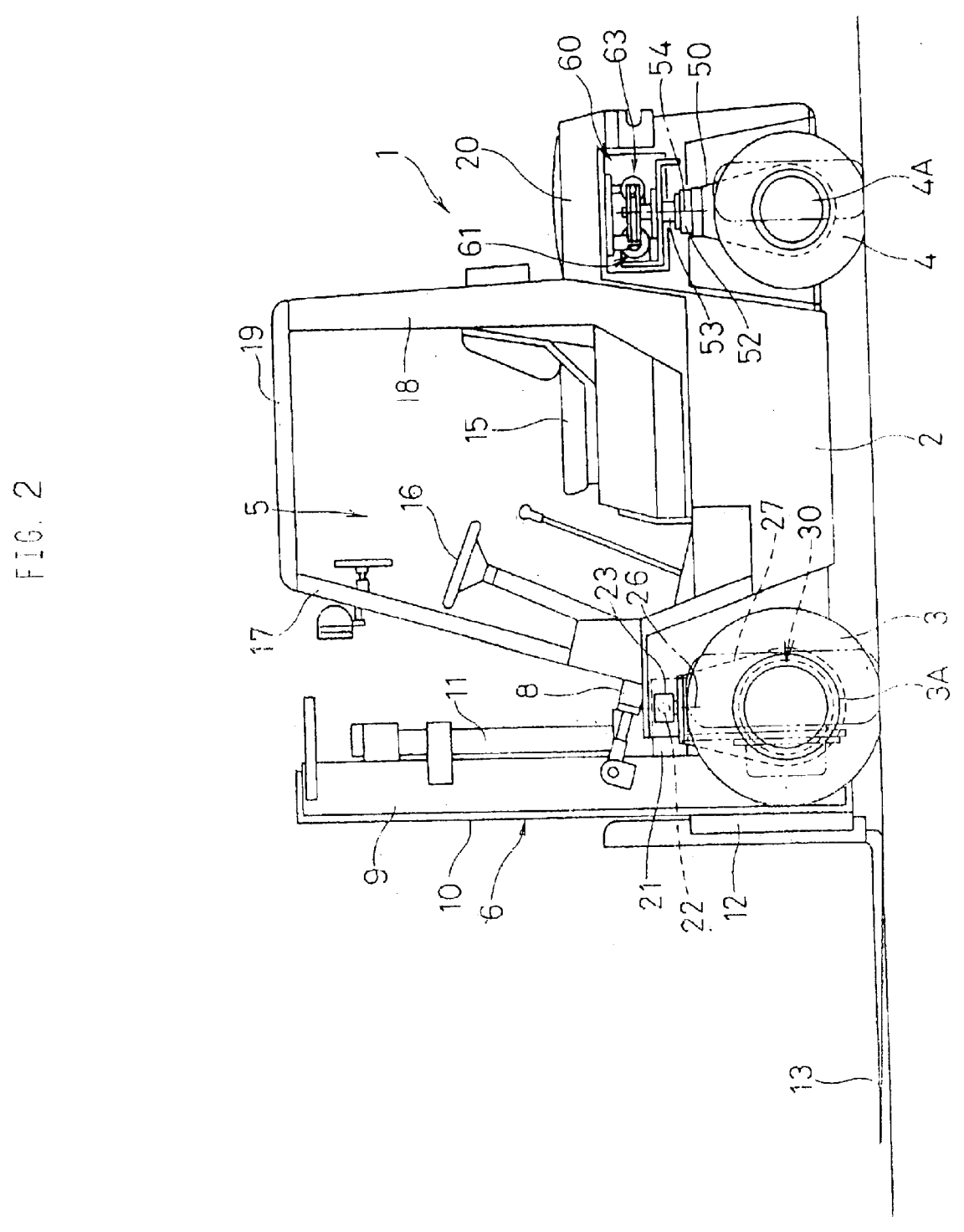
Figure 3:
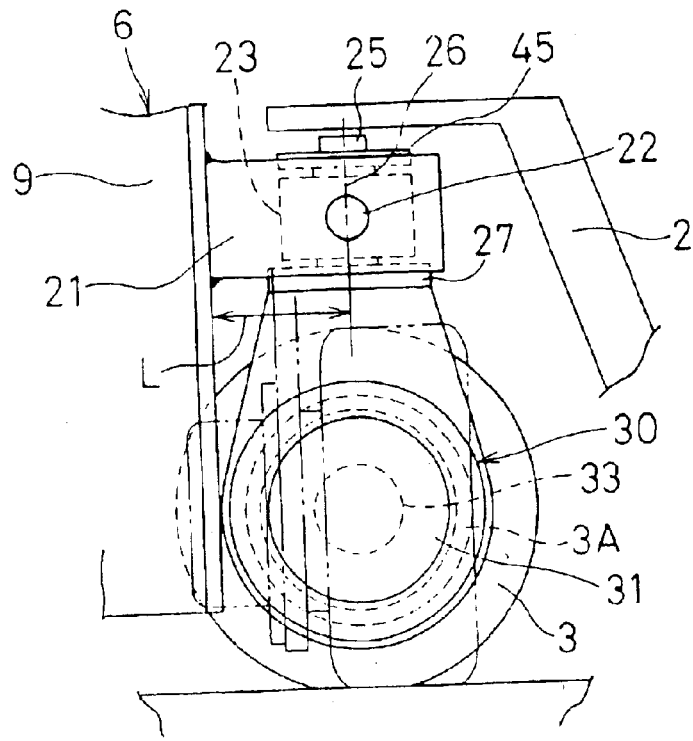
FIG. 3 is a side view of the front wheel portion of the forklift with a traverse travel system.
Figure 4:
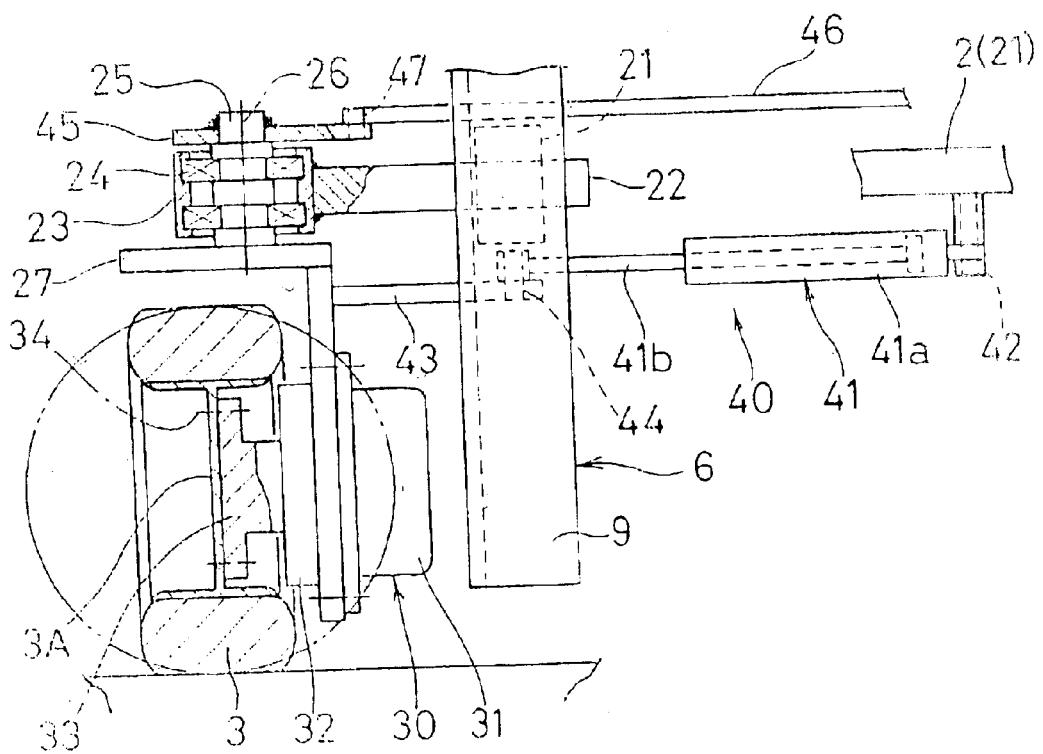
FIG. 4 is a partially cutaway front cross section of the front wheel portion of the forklift with a traverse travel system.

An embodiment of the present invention will be explained below using FIGS. 1 through 7. In these embodiments, components identical or almost identical to those of the conventional art (FIG. 8) are labeled with like reference symbols and detailed explanations thereof are omitted. Reference symbol 1 shows a forklift, 2 a vehicle body, 3 a front wheel (drive wheel), 4 a rear wheel (steering wheel), 5 a driver's seat, 6 a mast, 8 a tilt cylinder, 9 an outer rail, 10 an inner rail, 11 a lift cylinder, 12 a lift bracket, 13 a fork, 15 a seat, 16 a steering wheel, 17 a front pipe, 18 a rear pipe, 19 a headguard, and 20 a counterweight.

Each of the pair of right and left front wheels 3 are mounted to be steerable by 90 degrees (steerable straight sideways) in relation to the vehicle body 2. That is, in the lower areas on the backsides of both outer rails 9 of the mast 6, linking members 22 are placed through brackets 21. These linking members 22 are cylindrical and their length extends in the direction of the vehicle width, and the mast 6 is installed where it is capable of turning in the direction of forward and backward in the relation to the vehicle 2 through the linking members 22. Further, at the outer edge of these linking members 22, cylindrical holding members 23 are secured with their penetrated portions positioned in an upward/downward direction, and turning members 27 are placed so as to be able to turn around vertical axes 26 through bearing devices 24 and vertical axes 25 in the relation to these holding members 23.

These turning members 27 are inverted L-letter shaped with their horizontal plates connected to the lower edge of the vertical axes 25 and their vertical plates are provided with a travel drive means 30. This travel drive means 30 is configured with an electric motor 31, a speed reducer 32, and the like, and it is installed on the vertical plate portion through the mount of the speed reducer 32. At this time, rotating flanges from the speed reducers 32 become axles 33 facing sideways, and each of rims 3A of the front wheels 3 is installed directly to the axles 33 through a link 34.

Thus, each of the turning members 27 is positioned to be turnable around the vertical axes 26 in relation to the mast 6. This means that the pair of right and left front wheels 3 are moved by the travel drive means 30 installed on each turning member 27. The front wheels 3 are configured to position almost immediately under the vertical axes 26.

At this time, due to the turning members 27 being positioned so as to be able to turn around the vertical axes 26 in relation to the mast 6, the travel drive means 30 can be positioned in the manner that the steering allowable length L, which is defined as extending from vertical axis 26 to the back side of the outer rails 9 in the direction of the length of the vehicle, is used as a minimum length.

A front wheel turning means 40 to allow the above mentioned turning members 27 to turn is installed on the above mentioned vehicle 2. That is, the front wheel turning means 40 is comprised of a front wheel traverse travel cylinder 41 and this front wheel traverse travel cylinder 41 is mounted on the vehicle body 2 (or bracket 21) to allow its main body 41a to be able to move up and down through a vertical pin 42, and a piston rod 41b is connected to a link 43, which is secured to one of the turning members 27 to be able to turn relatively through a connecting pin 44 in the vertical direction. In addition, all parts that are configured between the right and the left turning members 27 and the arm 45 are inter-connected and are able to turn relatively through a link 46 and a connecting pin 47.

Consequently, by operating the front wheel traverse travel cylinder 41, the turning member 27 is turned through the link 43, which enables one of the front wheels 3 to steer straight sideways around the vertical axis 26 and the other front wheel 3 to steer straight sideways around the vertical axis 26 through arm 45, link 46, and the like. That is, according to the front wheel turning means 40, by the operation of common front wheel traverse travel cylinder 41, the right and left front wheels 3 are configured to steer in two different directions that is to be steered straight sideways.

The above mentioned items 41 through 47 and the like together form an example of the above-mentioned front wheel turning means 40.

Each of the pair of right and left rear wheels 4 is mounted steerable by 90 degrees (steerable straight sideways) in relation to the vehicle body 2. That is, the pair of right and left rear wheels 4, with their rims 4A being mounted respectively on the vertical-plate portion of the inverted L-letter shaped turning members 50 to be able to turn through an axle 51 and the like in a horizontal direction. The horizontal plates on turning members 50 are positioned to be able to turn around vertical axis centers 54 through bearing devices 52 and vertical axes 53 in relation to the vehicle body 2. The rear wheels 4 at this time are configured to position almost immediately under the vertical axis centers 54.

A rear wheel turning means 60 to allow the pair of right and left rear wheels 4 to turn around the vertical axis centers 54 is installed and this rear wheel turning means 60 is comprised of a steering cylinder 61, a rear wheel traverse travel cylinder 63 and the like.

This means that the steering cylinder 61 has its main body 61a positioned in the direction of the vehicle width, and a piston rod 61c connected to the piston 61b is protruding toward both sides in the direction of the vehicle width. Both edges of the projection of the piston rod 61c are secured to the vehicle body 2 respectively through a holding frame 62, thus the main body 61a is configured to be able to move in the direction of vehicle width.

The rear wheel traverse travel cylinder 63 exists as a right and left pair, and each of its main body 63a is integrated (connected) to the main body 61a of the previously mentioned steering cylinder 61 through a connecting member 64. At this time, each of the piston rods 63c connected to a piston 63b of the rear wheel traverse travel cylinder 63 is protruding outward in the direction of the vehicle width. In addition, an arm 65 is mounted on the upper edge of the above mentioned vertical axis 53 and the protruding edge of the piston rod 63 is connected to turn relatively through a link 66, connecting pins 67, 68, and the like in the vertical direction.

According to above mentioned rear wheel turning means 60, the operation of the steering cylinder 61 is conducted by moving the main body 61a toward the secured piston rod 61c in the direction of the vehicle width, and then, the main body 63a of the rear wheel traverse travel cylinder 63 is moved integrally with the main body 61a of the steering cylinder 61 in the direction of the vehicle width.

Meanwhile, between the holding frames 62, a guide (not depicted in the drawing) penetrating the connecting member 64 is placed, and with this guide, the main bodies of 61a and 63a are provided with both moving guidance and rotation prevention.

The operation of above mentioned steering cylinder 61 is configured to operate by an orbit roll (all hydraulic power steering) using the steering wheel 16. Additionally, the rear wheel traverse travel cylinders 63 are configured as a right and left pair, and are able to turn the rear wheels 4 respectively by actuating a control valve when the steering cylinder 61 is in neutral, and when the steering cylinder 61 is in operation, they are configured to be in a designated non-operational posture.

Therefore, by operating the rear traverse travel cylinders 63, the rear wheels 4 can be steered straight sideways around the vertical axis centers 54 through the turning members 50 and the like by turning the vertical axes 53 through the links 66, the arms 65, and the like. That is, by the operation of the rear traverse travel cylinders 63, the right and left rear wheels 4 are configured to be steered respectively in different directions that is steered straight sideways. By using the above mentioned 61 through 71 and the like, an example of the rear wheel rotating means 60, which will be able to rotate a pair of right and left rear wheels 4 around the vertical axes 54, is configured.

A battery 75 is loaded on the above mentioned vehicle body 2, and a controller 76 is attached to this battery 75. Additionally, cable 77 (power source supply part) from this controller 76 is connected to each of the previously mentioned electric motors 31.

The following is an explanation of the operation of the above-mentioned example.

Indicated by the solid lines in FIGS. 1(*a*), 2 through 6, and 7(*a*) are a normal travel time. At this time, the right and left front wheels 3 and the right and left rear wheels 4 are in the front-and-rear direction. The forklift 1 can be driven to travel by an operator sitting on the seat 15 of the driver's seat 5 by manipulating the steering wheel 16. That is, the forklift 1 can move forward and backward by supplying electrical power from the battery 75 to the electric motors 31 by the cables 77 after controlling the electrical power with the controller 76, thereby to drive the front wheels in the front-and-rear direction through the speed reducer 32, the axles 33, and the like.

Then, by operating a lifting lever to actuate the lift cylinders 11 to raise and or lower the forks 13 through the lift brackets 12 and the like along the mast 6, the expected fork operations can be executed. Further, by operating a tilting lever to actuate the tilt cylinders 8 to move the mast 6 around the linking members 22 (that is to tilt), the postures of the forks 13 can be varied through the lift brackets 12 and the like.

During the traveling time mentioned previously, the steering is conducted by operating the steering wheel 16. Therefore, by turning the steering wheel 16 to the left side, the main body 61*a* of the steering cylinder 61 is operated toward the left side by the orbit roll, and through the connecting member 64, the main body 63*a* of both rear wheel traverse travel cylinders 63 is moved integrally to the left side. In the meantime, both rear wheel traverse travel cylinders 63 are playing the link-like role in the non-operational posture in the designated range of retraction. Therefore, the movement to the left side of both of rear wheel traverse travel cylinders 63 is transmitted to the arms 65 through the links 66 to allow the turning members 50 to turn around the vertical axes 54, and then to allow the rear wheels 4 to steer to the left.

Further, when both of the rear wheel traverse travel cylinders 63 are retracted half way, both turning members 50 are turned around the vertical axis centers 54 in different directions and both of the rear wheels 4 can be turned to steer diagonally so that their edges are located slightly forward. In this condition, turning both front wheels 3 in relatively different directions makes the steering possible in their own locations. Additionally, in the same manner as described above, for example, by turning the steering wheel 16 to the right, right turns can be made.

Figure 5:
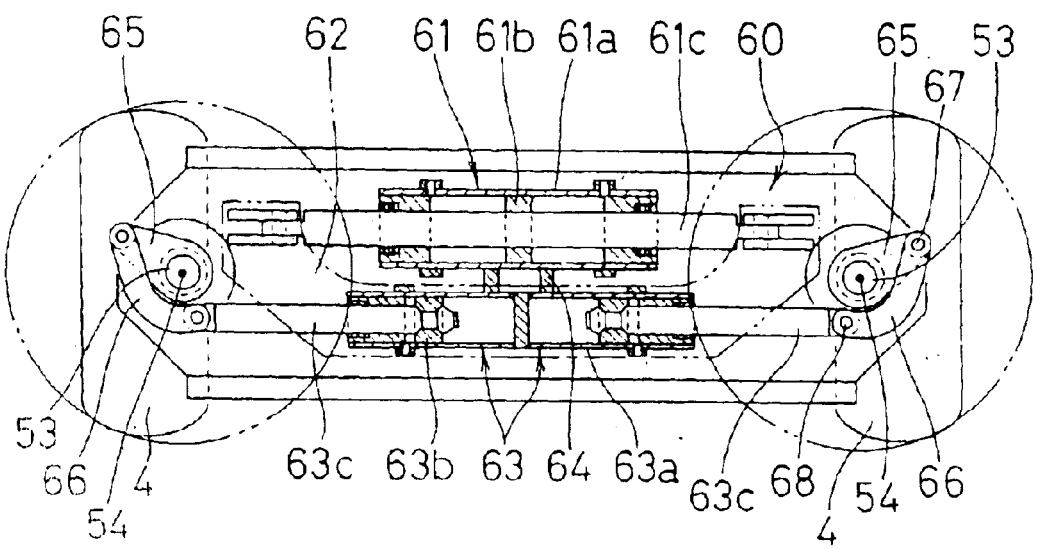
FIG. 5 is a partially cutaway top cross section of a rear wheel portion of the forklift with a traverse travel system.
Figure 6:
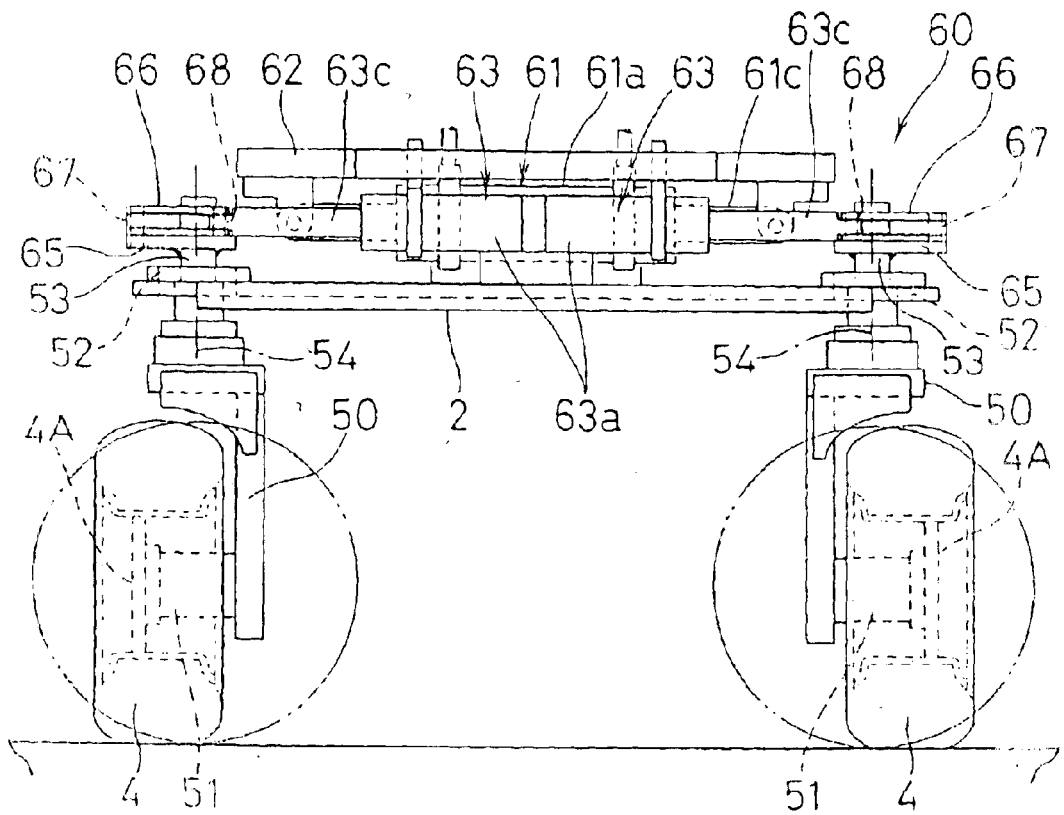
FIG. 6 is a rear view of the rear wheel portion of the forklift with a traverse travel system.

When changing from a normal travel operation to a lateral travel operation, at first, the steering cylinder 61 is positioned in neutral (traveling straight forward) as shown in FIG. 5. With this condition, for example, a lever-style traverse travel mode switch (not depicted in the drawing), can be manipulated to actuate the front wheel rotating means 40 and the rear wheel rotating means 60.

That is, using the front wheel rotating means 40, a lever style traverse travel mode switch can be operated to tilt, thereby to move the front traverse travel cylinder 41 which enables the turning member 27 to turn around the vertical axis 26 through the link 43. Thus as indicated by the virtual lines shown in FIGS. 1(*b*), 2 through 4, and the FIG. 7(*b*), the front wheels 3 are steered by 90 degrees (straight sideways) in relation to the vehicle body 2. At this time, the travel drive means 30 is also turned together with the turning members 27, and each electric motor 31 is positioned on the outside of the outer surface of the outer rail 9. Since the front wheels 3 are positioned almost immediately under the vertical axis 26, the front wheels 3 and the like can be made compact and steerable by 90 degrees.

Figure 7:
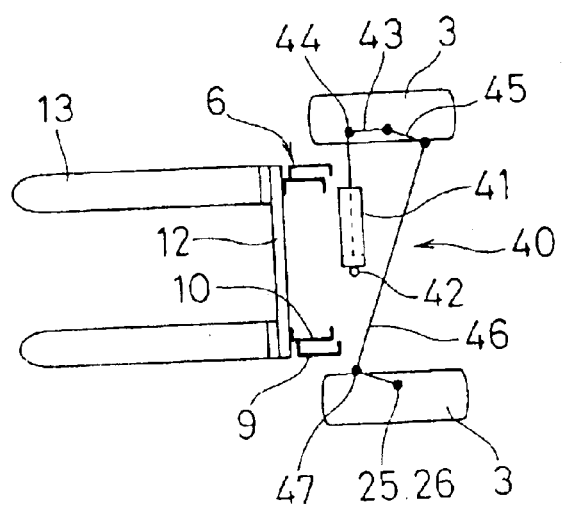
FIG. 7 is a schematic top view of the forklift with a traverse travel system, emphasizing turning means, wherein (a) shows normal traveling time and (b) shows traverse traveling time.
Figure 7:
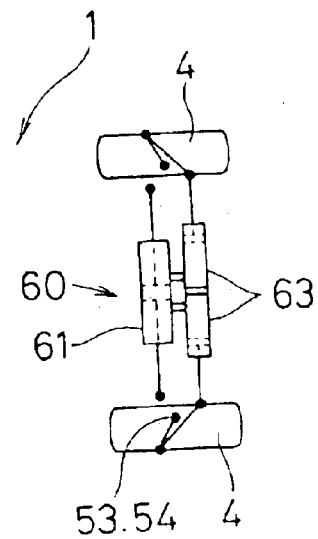
Figure 7:
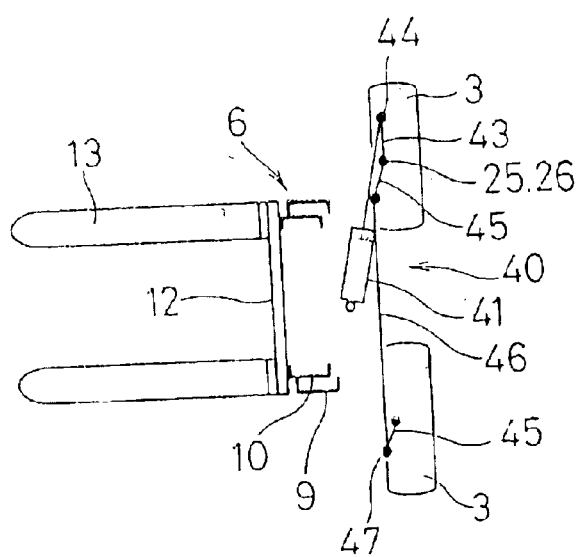
Figure 7:
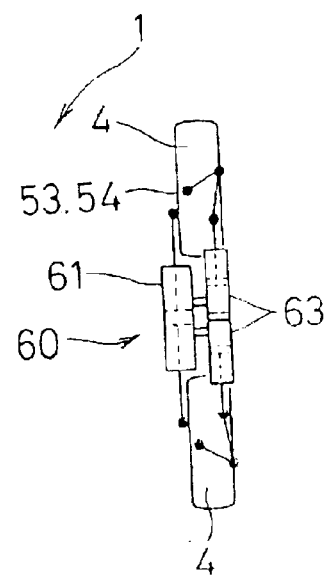
Figure 8:
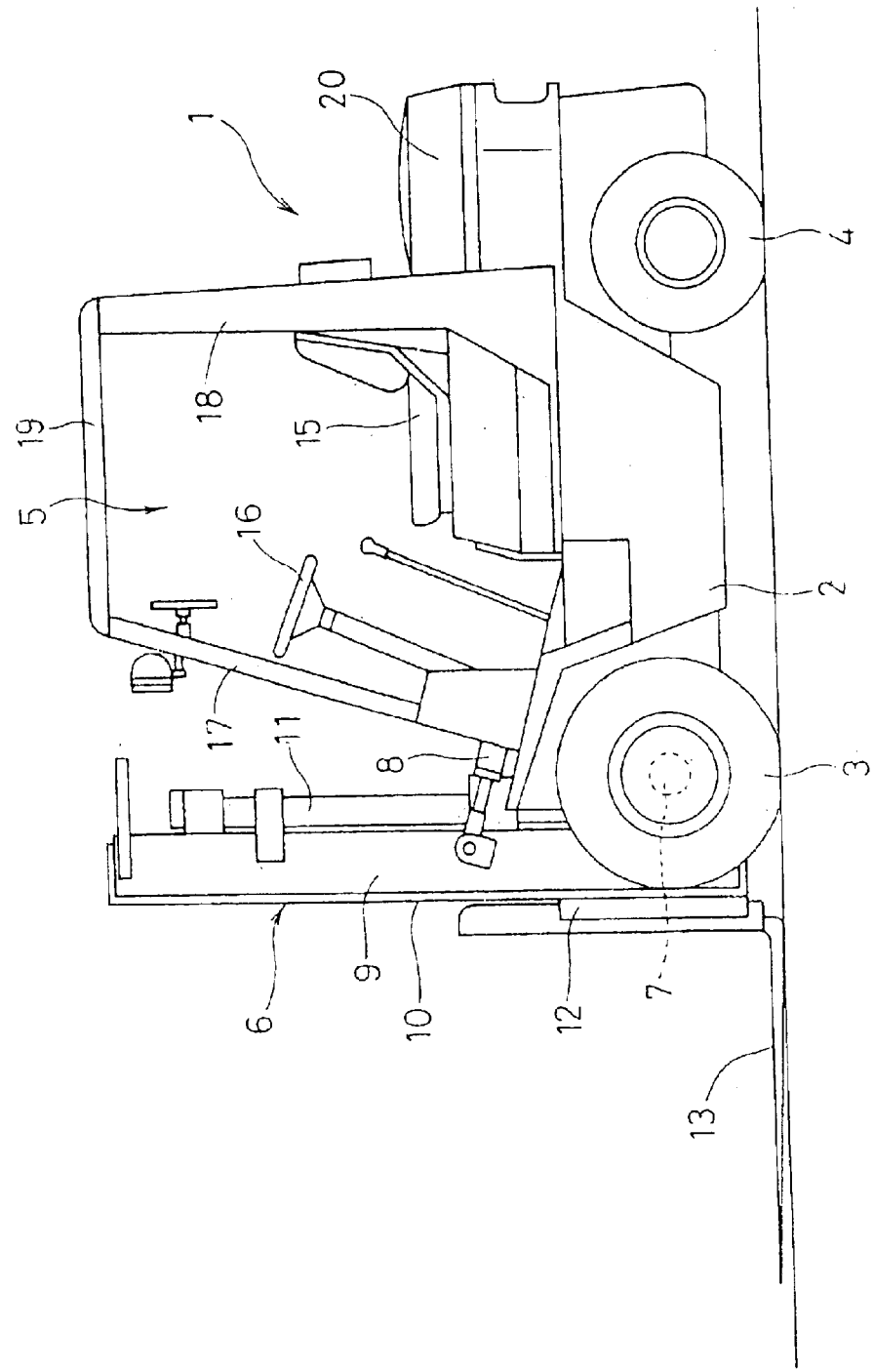
FIG. 8 is a side view of a forklift of a conventional art.

The rear wheel rotating means 60 retracts both rear wheel traverse travel cylinders 63 by the control valve and then transmits the projecting movement of the piston rods 63*c* to the arms 65 through the links 66 for the turning members 50 to turn around the vertical axis centers 54, thus as indicated by the virtual lines of FIGS. 1(*b*), 2, 5 and 6, and shown in FIG. 7(*b*), the rear wheels 4 can be steered by 90 degrees (straight sideways) in relation to the vehicle body 2.

When the front wheels 3 and the rear wheels 4 were steered, or the front wheels 3 and the rear wheels 4 were detected by a sensor as having changed in the direction of travel to straight sideways, an indicator lamp is activated, thereby allowing the traverse travel mode to be affected.

Therefore, an operator of the forklift 1 sitting in the seat 15 of the driver's seat 5 can operate the steering wheel 16, and as explained above, can supply the electrical power from the battery 75 after being controlled by the controller 76 through the cables 77 to drive each electric motor 31, enabling the front wheels 3 to drive and turn in the front-and-rear direction to make the forklift 1 to travel laterally in either the right or the left direction. The pair of right and left rear wheels 4 at this time will follow the front wheels.

This traverse traveling capability facilitates, for example, to transport elongated objects with the forks 13. Correction of straightness in the lateral travel mode can be easily effected by tilting the lever forward or backward to slightly actuate the front wheel traverse travel cylinders 41 in order for fine adjustments of the angle of the front wheels 3.

In the forklift 1 described above, when the front wheels 3 are steered by 90 degrees in relation to the vehicle body 2 by the front wheel rotating means 40, because the front wheels 3 with the minimum allowable steering length L (which is defined as the length extending from the vertical axis 26 to the rear side of the outer rail 9 in the direction of the vehicle length), this will enable the electric motors 31 to be positioned outside of the outer surface of the outer rail 9 by turning the travel drive means 30 integrally.

For this reason, although it is a style that the front wheels 3 can be steered straight sideways, the mast 6 does not have to be positioned more forwardly than necessary in the relation to the front wheels 3 and the like due to the travel drive means 30, therefore, the mast 6 can be positioned in the same manner with the conventional non-lateral traveling forklifts. That is the reason that the balance of front and rear can be satisfactorily maintained without increasing the self-weight. Since the self-weight does not need to be increased, this saves the wasted use and consumption of the battery 75.

Although the forklift 1 of a counter balance type is shown in the embodiment above, this can also be applied to side forklifts.

In the embodiment described above, the electric motors 31 are used as a travel drive means 30, however, this can also be a type with hydraulic motors. To use the hydraulic motors, as a driving style of the forklift 1, 2-pump 2-motor type hydraulic drive system or 1-pump 2-motor type hydraulic drive system can be used.

In the above mentioned embodiment, a style utilizing the common means, the front wheel rotating means 40 to allow the pair of right and left front wheels 3 to turn simultaneously is shown, however, this can be a style to turn the pair of right and left front wheels 3 each separately by its own front turning means.

Although a type having the rear wheel turning means 60 capable of turning the pair of right and left rear wheels 4 simultaneously is shown in the above mentioned embodiment, one rear wheel of the pair of rear wheels 4 may be a type performing steering by means of a steering wheel, while the other being of a follow-up castor type. In this case, when switching to a lateral travel mode, one of the rear wheels 4 is forcedly steered by the cylinder or the like. A castor style may also be used for both rear wheels 4.

Although the type having a pair of right and left linking members 22 placed on both outer rails 9 of the mast 6 through the brackets 21, this can be of a type having a linking member 22 common to both the right and left.

What is claimed is:

1. A forklift with a traverse travel system, comprising:

a pair of right and left front wheels and a pair of right and left rear wheels mounted to a vehicle body, respectively to be steerable by 90 degrees;

a mast positioned on a front edge of the vehicle body;

forks and linking members each installed on the mast;

holding members fixed on the linking members; and turning members mounted to the holding members to be rotatable around vertical axes, the turning members being mounted with the front wheels and provided with turning means for turning the turning members, whereby the pair of right and left front wheels are operatively connected to travel drive means respectively installed onto the turning members.

* * * * *